(12) United States Patent
Cefo

(10) Patent No.: US 6,242,839 B1
(45) Date of Patent: Jun. 5, 2001

(54) COMMUTATOR AND METHOD FOR MANUFACTURING

(75) Inventor: Nevres Cefo, Westlake, OH (US)

(73) Assignee: Kirkwood Industries, Inc., Cleveland, OH (US)

( * ) Notice: Subject to any disclaimer, the term of this patent is extended or adjusted under 35 U.S.C. 154(b) by 0 days.

(21) Appl. No.: 09/515,920

(22) Filed: Mar. 1, 2000

(51) Int. Cl.$^7$ .................................................. H02K 13/04
(52) U.S. Cl. ............................................. 310/233; 29/597
(58) Field of Search .................................. 310/233, 235, 310/236, 42, 43; 29/596–598

(56) References Cited

U.S. PATENT DOCUMENTS

| | | | |
|---|---|---|---|
| 4,121,335 | 10/1978 | Berman et al. | 29/597 |
| 4,188,713 | 2/1980 | Kawano et al. | 29/597 |
| 4,349,384 | 9/1982 | Weinert | 75/208 R |
| 4,358,319 | 11/1982 | Yoshida et al. | 75/200 |
| 4,399,383 * | 8/1983 | Kamiyama | 310/233 |
| 4,456,846 | 6/1984 | Stokes | 310/233 |
| 4,562,369 | 12/1985 | Gerlach et al. | 310/235 |
| 4,621,514 | 11/1986 | Dohmann et al. | 75/354 |
| 4,667,394 | 5/1987 | Bode et al. | 29/597 |
| 5,003,212 * | 3/1991 | Ibe et al. | 310/235 |
| 5,204,574 | 4/1993 | Kanno et al. | 310/233 |
| 5,422,528 * | 6/1995 | Prahl | 310/235 |
| 5,584,115 | 12/1996 | Takahashi | 29/597 |
| 5,679,996 * | 10/1997 | Strobl | 310/237 |

* cited by examiner

*Primary Examiner*—Tran Nguyen
(74) *Attorney, Agent, or Firm*—Calfee, Halter & Griswold LLP

(57) ABSTRACT

Commutators for electro-dynamic machines such as electric motors comprise a cylindrical shell of insulated commutators bars, each of which has an outer layer with tangs extending from the outer layer and an inner layer with anchoring tabs extending therefrom. The commutating bars are typically produced from two strips of copper or other conductive metal. The inner layer may be formed of a thinner but stronger material, even of a non-conductive material, but is normally preferable to use two strips of copper to facilitate fusion of the materials together. The first strip, which is typically somewhat thicker than the second, is formed by punching so that partially formed tangs extend laterally from the side of the strip. The second strip is formed in a similar process to provide anchoring tabs extending from the sides of the second strip. These commutators can be produced economically and efficiently and can be adapted to a wide variety of applications and requirements.

11 Claims, 2 Drawing Sheets

COMMUTATOR AND METHOD FOR MANUFACTURING

TECHNICAL FIELD

This invention relates to commutators for electrodynamic machines such as motors and generators. More particularly, it relates to cylindrical commutators designed for economical, efficient and flexible production, and to methods for making these commutators.

BACKGROUND

Commutators are routinely used to control the flow of electrical energy in rotating electrodynamic machines such as motors and generators. One typical commutator construction consists of a cylindrical ring of commutator bars supported by and positioned around an insulating hub. Tangs for electrical connections normally extend from one end of each commutator bar, and the bars are normally provided with inwardly extending anchoring bars to secure the bars to the insulating hub. The bars are normally slit from a cylindrical shell, produced by shaping a formed strip of metal into a cylindrical shell, molding the insulating hub inside the shell and slitting the shell to form the individual commutator bars.

The formed strips from which the cylindrical shells are produced are conventionally made from a single strip of copper or other metal by single stage or progressive forming techniques which are known by designations such as coin-lug design, casselated design, skived design, grooved design and the like. In all of these techniques the tangs and anchoring tabs are formed on a single strip of metal by single stage or progressive tooling. All of these techniques suffer from certain common problems. They require expensive tooling, do not provide optimal dimensional control and do not allow desired balance between bar weight and locking lug positions. This leads to excessive rejection rates, parts with excessive variations in dimensions or unbalanced centripetal forces, which in turn can lead to reduced performance and higher failure rates.

SUMMARY OF THE INVENTION

This invention provides commutators for electrodynamic machines, such as electric motors, that can be produced economically and efficiently and can be adapted to a wide variety of applications and requirements. These commutators comprise a cyclindrical shell of commutators bars, each of which has an outer layer with tangs extending from the outer layer and an inner layer with anchoring tabs or locking lugs extending therefrom. The commutating bars are typically produced from two strips of copper or other conductive metal. The inner layer may be formed of a thinner (or thinner and stronger) material, even a non-conductive material, but it is normally preferable to use two strips of copper to facilitate proper mechanical connection of the materials. The first strip, which is typically somewhat thicker than the second, is formed by punching or cutting so that partially formed tangs extend laterally from the side of the strip. The second strip is formed in a similar process to provide anchoring tabs extending from the sides of the strip. The second strip differs from the first in that the first strip normally only has tangs along one side of the strip, whereas the second strip normally has anchoring tabs along both sides. Also, the anchoring tabs typically extend at an angle to the plane of the second strip, whereas the partially formed tangs are generally co-planer with the first strip in the initial stages of production. As will be seen below, this invention simplifies fabrication of a wide variety of anchoring tabs, and the adaptation of the anchoring system to many different applications.

After formation of the tangs and anchoring tabs, the first strip and second strip are joined together by any of a number of techniques, including spot welding, cold welding, resistance welding, laser welding, electron beam welding, brazing, forging, soldering or adhesives. The composite strip is then formed into a cylindrical structure, with the first strip on the outside of the cylinder. The partially or fully formed tangs generally extend from the first strip substantially parallel to the axis of the cylinder, but may be angled in for certain installations. The anchoring tabs generally extend axially and inwardly to provide a strong connection with an insulating hub which is molded on the inside of the cylindrical structure. With the cylindrical metallic shell firmly supported by the insulating hub, the metallic shell is slit through both strips into a series of commutating bars spaced and insulated from each other around the periphery of the insulating hub.

The use of two metallic strips facilitates adaptation of this commutator to a wide variety of motors and other dynamo-electric machines. The first or outer strip can be designed to provide requisite electrical conductivity, surface wear characteristics and tang strength. The second or inner strength can be designed to minimize the weight of the commutator while at the same time providing a secure connection between the commutating bars and the insulating hub.

Other features and advantages of this invention will be apparent from the following detailed description.

DETAILED DESCRIPTION OF THE INVENTION

Figure 1:
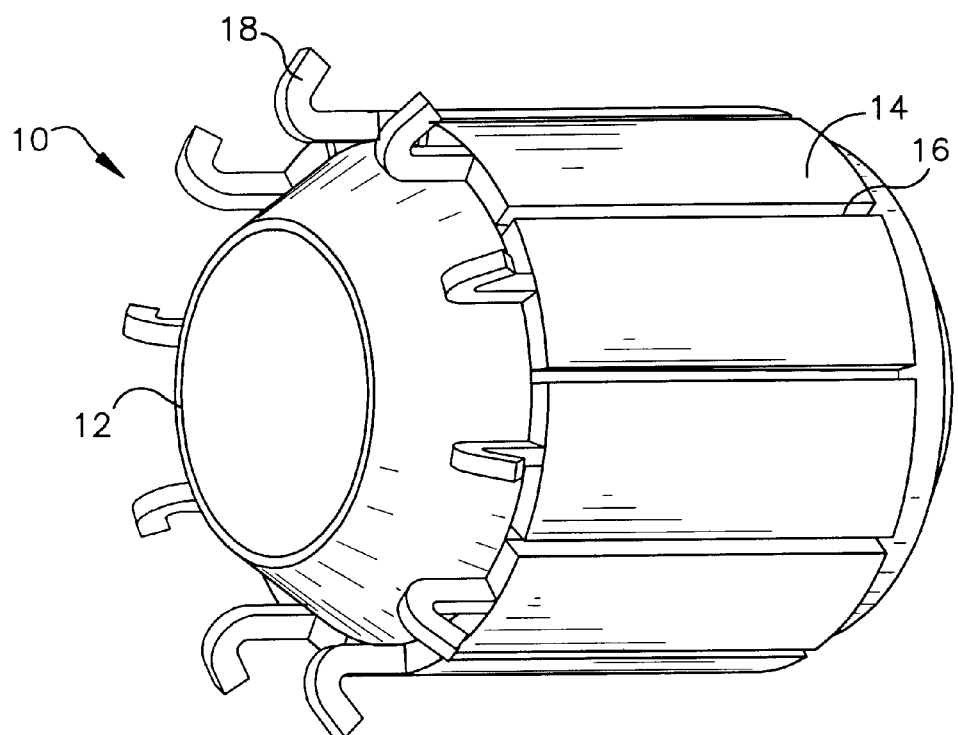
FIG. 1 is a perspective view of a completed commutator embodying this invention.

The commutator illustrated in FIG. 1, referred to generally as 10, can be adapted to a wide variety of motors and other dynamoelectric machines, including automotive applications such as power windows, power seats, ABS systems and motor starters, and home appliances such as power tools, vacuum cleaners, mixers, blenders and washing machines. As will be seen below, the individual elements of this commutator can be modified to suit particular requirements of individual applications, which increases the field of use. This commutator is sturdy, dependable, and can be produced with common, uncomplicated forming tools, which makes commutators embodying this invention economical to produce.

As illustrated in FIG. 1, commutator 10 comprises a series of commutator bars 14, which are typically produced from copper alloys such as CDA 105 or CDA 107, supported by and spaced around the periphery of an insulating hub 12. The individual commutator bars are separated by gaps 16 which electrically insulate the individual commutator bars 14 from each other. A formed tang 18 extends from each commutator bar 14. The tangs 18 are used for electrical connections from the commutator bars to the armature windings of the motor in which the commutator is installed.

Figure 2:
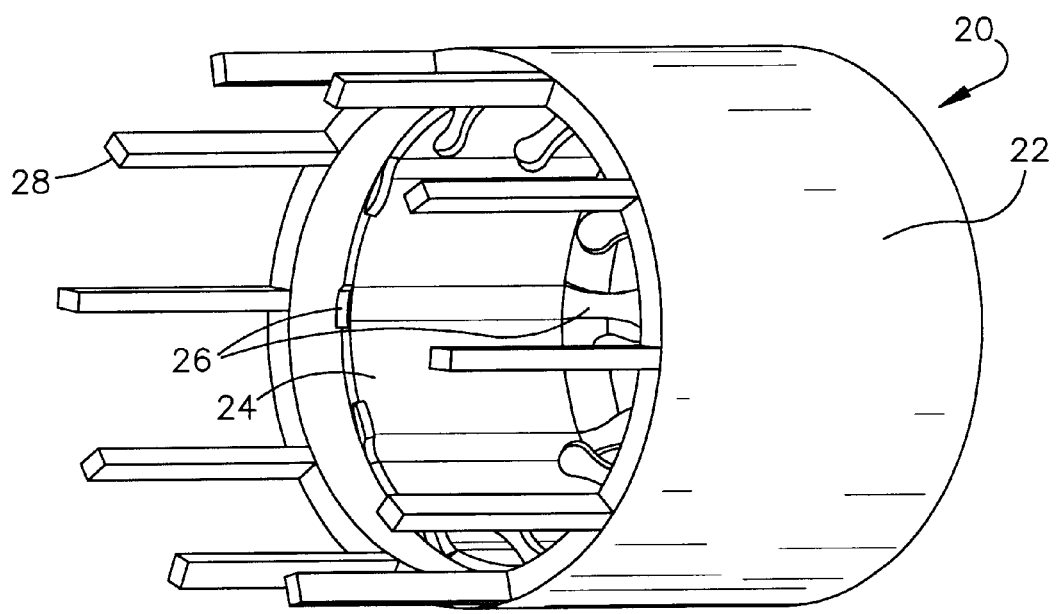
FIG. 2 is a perspective view of a cylindrical metallic shell for the production of the commutator shown in FIG. 1.
Figure 3:
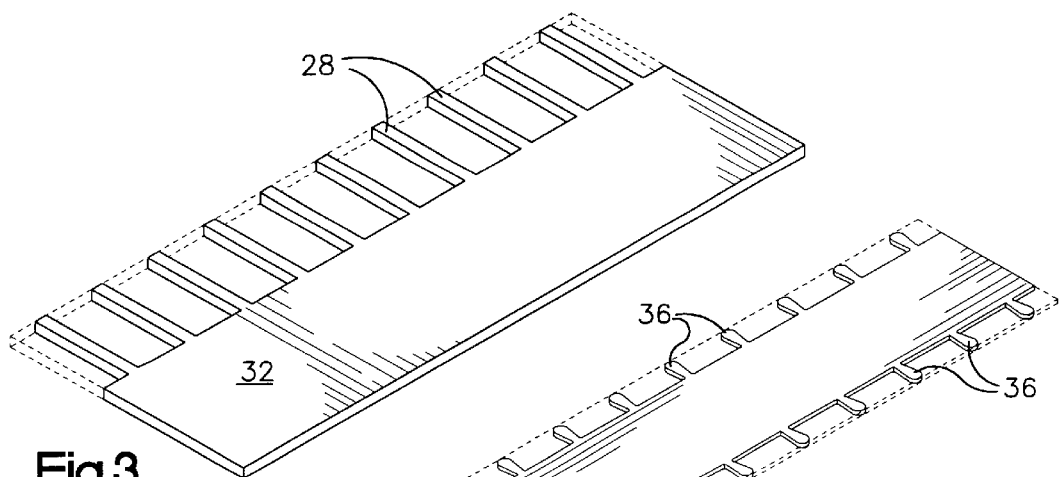
FIG. 3 is a perspective view of a metallic strip that forms the outer layer of the cylindrical shell in FIG. 2. The formed strip is illustrated in solid lines, and the dimensions of the strip prior to the initial forming of tangs along one edge of the strip are indicated by phantom lines.

The individual commutator bars 14 are produced from a cylindrical shell, generally referred to as 20, shown in FIG. 2. The cylindrical shell 20 has an outer metallic layer 22 with partially or fully formed tangs 28 extending from layer 22 parallel to the axis of the shell 20, and an inner layer 24 with anchoring tabs 26 extending from both sides of the inner layer 24. The anchoring tabs 26 extend at an angle toward the central axis of shell 20. As illustrated in FIG. 2, it is normally desirable for inner layer 24 and the anchoring tabs 26 that project therefrom to be somewhat thinner than outer layer 22 and its tangs 28, which must meet higher wear and load requirements. For some applications, it may be desirable to produce the inner layer 24 from a different alloy or material than outer layer 22. However, it will normally be preferable to produce both layers from a common alloy for simplicity of procurement and joining.

Figure 4A:
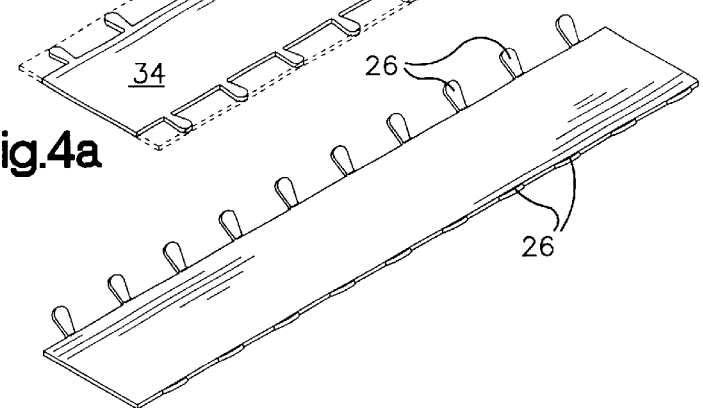
FIG. 4a is a perspective view of a strip for the formation of the inner layer on the cylindrical shell in FIG. 2, illustrating the anchoring tabs which extend outwardly from both sides of the strip after the initial forming operation. Again, the dimensions of the strip prior to the forming of the anchoring tabs along the edges of the strip are indicated by phantom lines.

Materials and steps in the production of cylindrical shells such as the one illustrated in FIG. 2 are represented in FIGS. 3, 4a, 4b and 5–7. The outer metal layer 22 of the shell 20 in FIG. 2 is produced from a flat strip of copper 32, the initial outline of which is shown in phantom in FIG. 3. As illustrated in that figure, partially formed tangs 28 are produced along one side of strip 32, normally by punching. The inner layer 24 for shell 20 is produced from a similar (but normally somewhat thinner) strip 34, shown in FIGS. 4a an 4b. Partially formed anchoring tabs 36 are produced along both edges of strip 34, as shown in FIG. 4a, generally by the same punching process as used for the outer layer. The strip illustrated in 4a then receives another forming operation, in which the partially formed, flat anchoring tabs 36 are bent upwardly, typically by a forming or rolling tool, to produce the angled anchoring tabs in FIG. 4b. This is substantially less expensive than the forming techniques for producing anchoring tabs in conventional commutator production processes, which require more elaborate equipment, long set-ups, maintenance of tooling and more complicated forming procedure.

Figure 4B:
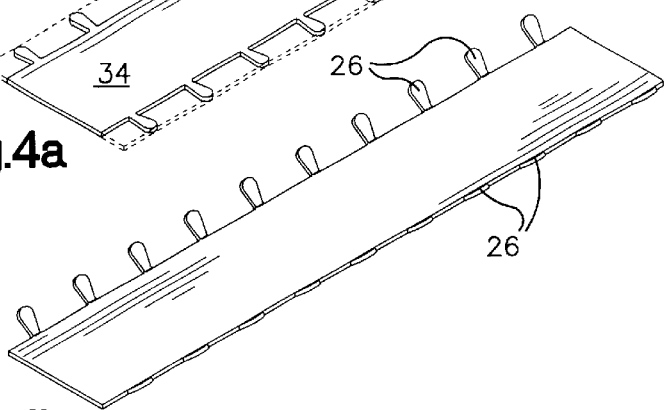
FIG. 4b is a perspective view of the same strip after the anchoring tabs have been formed to extend at an angle to the plane of the strip.
Figure 5:
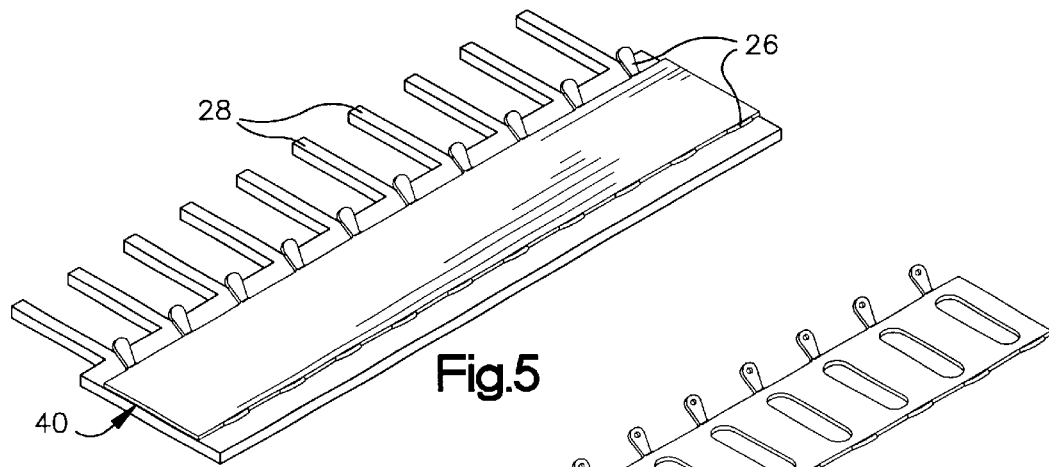
FIG. 5 is a perspective view of the composite strip formed by welding or otherwise joining the inner strip illustrated in FIG. 4b to the outer strip illustrated in FIG. 3.

The strip in FIG. 4b is then secured to the finished strip for the outer layer, as illustrated in FIG. 5, to form a composite strip 40. The strips are typically joined by laser beam or electron beam welding, which are other simple and reliable production processes, but other processes and techniques such as spot-welding, forging, brazing, continuous welding, ultrasound welding, and the like may also be used. As shown in FIGS. 2 and 5, the strips are normally positioned so that the anchoring tabs 26 are substantially aligned with the partially formed tangs 28 on strip 32, and with the inner strip 34 approximately in the longitudinal center of outer strip 24. This leaves room between the tangs and anchoring tabs to slit the cylindrical shell into spaced commutator bars, with anchoring tabs 26 in the center of each commutator bar 14. The inner strip 22 is positioned to accommodate anticipated centrifigal forces in the anchoring tabs 26 located at the center of gravity of the commutator bars.

Composite strip 40 is formed into the cylindrical shell 20 illustrated in FIG. 2 in a rolling or other forming operation, and an insulating hub is molded inside the cylindrical shell so that anchoring tabs 26 are embedded in the insulating hub 12. The insulating hub is normally produced of a fiber reinforced phenolic molding material using conventional molding techniques but other dielectric materials can be applied with similar processes. With the cylindrical shell 20 securely attached to insulating hub 12, the shell is slit to produce the gaps 16 which insulate the individual commutator bars in FIG. 1 from each other. The partially formed tangs 28 on the shell illustrated in FIG. 2 may be formed into the finished tangs 18 shown in FIG. 1 either before or after the shell 20 is slit to form the commutator bars.

Figure 6:
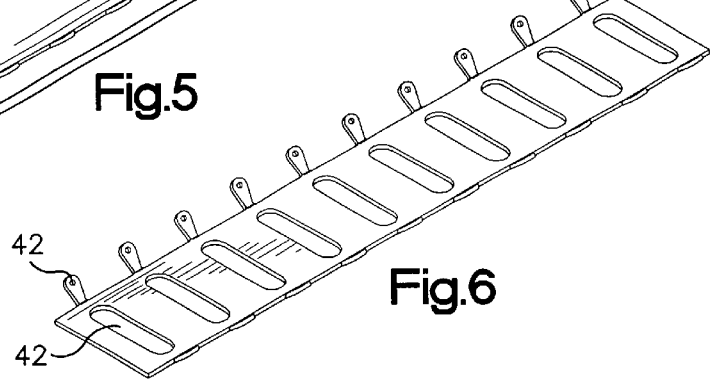
FIG. 6 is a perspective view of an alternate composite strip with examples of many arrangements of holes that may be used in the structures of this invention to reduce weight, lock commutator bars to the hub and achieve other mechanical and processing advantages.

As may be seen from the foregoing, the use of two separate strips, formed individually and then welded or otherwise joined together, allows applicant to use simple, dependable and economical forming equipment and procedures. This invention also allows applicant to tailor individual parts of the cylindrical shell structure to reduce costs, improve performance or both. For example, as shown in FIG. 6, holes 42 may be punched, drilled or otherwise provided in the inner strip 34 and/or the anchoring tabs 26 or various combinations thereof in order to reduce the weight of the finished commutator bars, decrease bar movement at high speed and temperature, attach cylindrical shell 20 more securely to the insulating hub 12, increase the maximum speed for the commutator, and improved heat dissipation. Similarly, the anchoring tabs may be provided with projections, serpentine edges or other irregular shapes to secure the tabs to the hub.

Those skilled in the art will readily appreciate that many other modifications may be made in the structure disclosed above. The foregoing description is merely illustrative, and is not meant to limit the scope of this invention, which is defined by the following claims.

What is claimed is:

1. A commutator for a dynamoelectric machine comprising:
   a cylindrically arranged ring of linearly extending commutator bars, each of said bars comprising an outer layer having a tang extending therefrom and an inner layer having at least one anchoring lug extending therefrom;
   said bars extending substantially parallel to an axis of said commutator, being separated from other bars by axially extending slits, and being formed by:
      joining a first strip of metal having tangs extending laterally therefrom to a second strip of metal having anchoring tabs extending therefrom to form a composite strip;
      forming said composite strip into a cylindrical shell, with said first strip forming an outer layer of said shell and said second strip forming an inner layer of said shell; and
      slitting said shell to form said cylindrically arranged ring of commutator bars.

2. A commutator according to claim 1 wherein said commutator bars are spaced around and supported by an insulating hub, said hub being molded inside said cylindrical shell, with said anchoring tabs embedded in said hub, before said shell is slit to form said commutator bars.

3. A commutator according to claim 1 wherein said second strip is joined to said first strip so that said anchoring tabs are substantially aligned with said tangs, and said second strip is positioned approximately in a longitudinal center of said first strip.

4. A commutator according to claim 1 wherein said tangs extend from one side of said first strip and said anchoring tabs extend from two opposite sides of said second strip.

5. A commutator according to claim 1 further comprising openings in inner layers of at least some of said bars.

6. A commutator according to claim 5 wherein said openings are positioned between said slits.

7. A commutator according to claim 5 further comprising openings in at least some of said anchoring tabs.

8. A commutator according to claim 1 wherein said second strip is fused to said first strip.

9. A commutator according to claim 1 wherein said second strip is welded to said first strip.

10. A commutator according to claim 1 wherein at least some of said anchoring tabs comprise projections.

11. A commutator according to claim 1 wherein at least some of said anchoring tabs comprise serpentine edges.

* * * * *